United States Patent [19]
Gruner

[11] 3,920,044
[45] Nov. 18, 1975

[54] DEVICE FOR OBTAINING QUIET OPERATION OF VALVES, MORE PARTICULARLY PRESSURE REDUCING VALVES

[75] Inventor: Karl Gruner, Offenbach am Main, Germany

[73] Assignee: Samson Apparatebau A.G., Germany

[22] Filed: July 11, 1973

[21] Appl. No.: 378,162

[30] Foreign Application Priority Data
July 11, 1972 Germany............................ 2234053
June 14, 1973 Germany............................ 2330392

[52] U.S. Cl. .......... 137/625.3; 138/43; 251/DIG. 3; 251/127
[51] Int. Cl.² ...................... F15D 1/10; F16K 47/08
[58] Field of Search .... 137/625.3; 251/127, DIG. 3; 138/43

[56] References Cited
UNITED STATES PATENTS

| | | | |
|---|---|---|---|
| 2,008,722 | 7/1935 | McClintock | 138/43 |
| 2,042,462 | 6/1936 | Hahn | 138/43 |
| 2,587,016 | 2/1952 | Watts | 138/43 X |
| 3,133,557 | 5/1964 | Gongwer | 137/512.1 |
| 3,253,300 | 5/1966 | Gove et al. | 138/43 X |
| 3,513,864 | 5/1970 | Self | 138/42 X |

FOREIGN PATENTS OR APPLICATIONS

| | | | |
|---|---|---|---|
| 630,128 | 5/1936 | Germany | |
| 1,551,627 | 11/1968 | France | |
| 1,008,977 | 5/1957 | Germany | 251/127 |

Primary Examiner—Arnold Rosenthal
Attorney, Agent, or Firm—Watson, Cole, Grindle & Watson

[57] ABSTRACT

A device for obtaining quiet operation of valves for flowing media, more particularly of pressure reducing valves, whose choke or valve seat opening cooperates with a choke or valve closing body having fluid flow directed against its direction of closing. The choke body has several annular outlet gaps with an adjustable gap width, which together produce the required choke cross-section.

4 Claims, 8 Drawing Figures

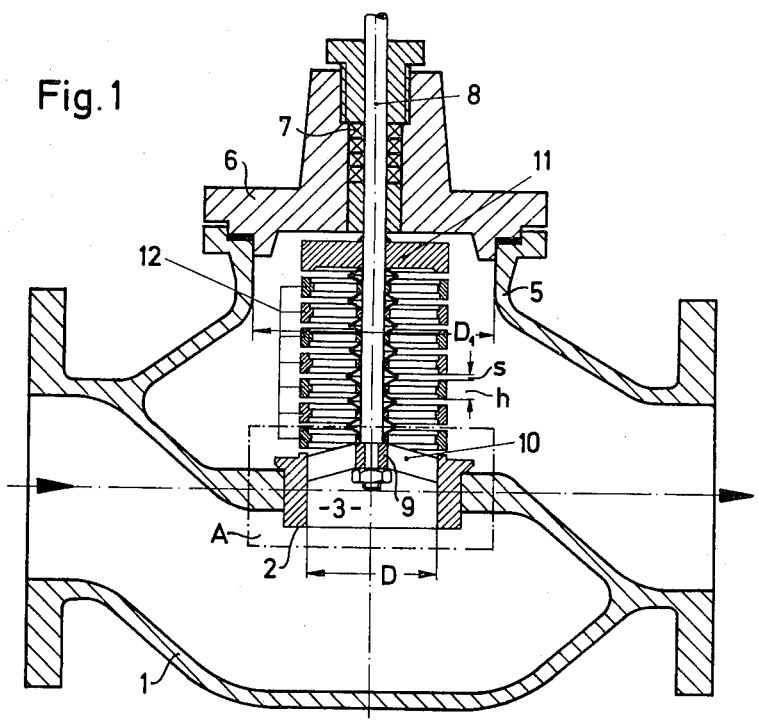
Fig. 1
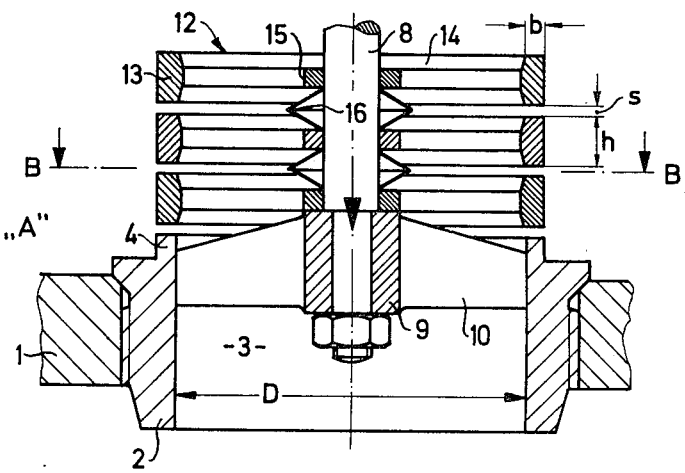
Fig. 2 "A"
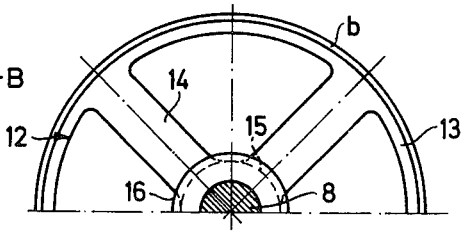
Fig. 3 B-B

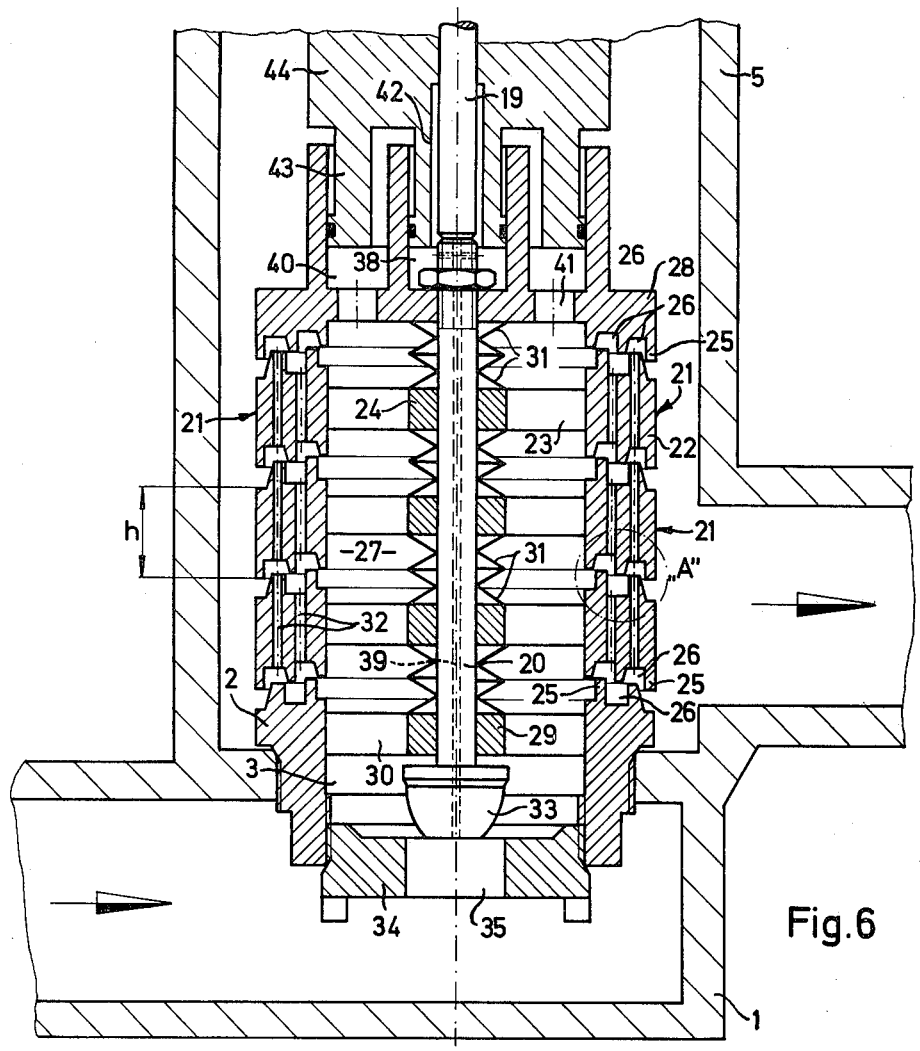
Fig. 6
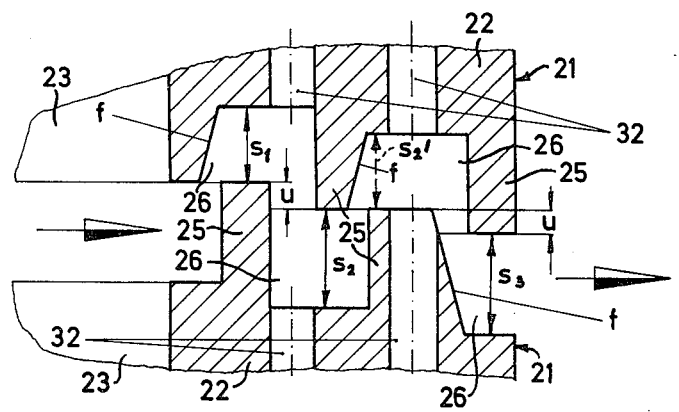
Fig. 7 "A"

DEVICE FOR OBTAINING QUIET OPERATION OF VALVES, MORE PARTICULARLY PRESSURE REDUCING VALVES

BACKGROUND OF INVENTION

1. Field to which invention relates

The present invention relates to a device for obtaining quiet operation of valves for flowing media, more particularly of pressure reducing valves, whose choke or valve seat opening cooperates with a choke or valve closing body having fluid flow directed against its direction of closing.

2. The prior art

Valves of this type, more particularly pressure reducing means for liquids, gases and vapors, may lead to the production of a considerable amount of noise in operation and be subject to pronounced wear if a certain pressure difference in the equipment is exceeded. How large this pressure difference may be in particular cases depends inter alia on the geometry of the choke device. In this respect it is also important that the medium flow should not approach the cavitation formation range or supersonic velocity. Therefore, various devices have completely different noise behavior in the case of identical operating conditions. The factors are fairly complicated and to date it has usually been necessary in such cases to undertake numerous tests in order to keep noise production as low as possible. In practice the lack of reliable rules or clues for the construction of low noise equipment has been found to be very disadvantageous.

SUMMARY OF INVENTION

One aim of the present invention, therefore, is to provide a man in the art with simple and reliable instructions for the creation of choke and pressure reducing means or other load removing means which are able to cope with substantially greater pressure differences than prior art conventional equipment without an acceptable noise level being exceeded during operation.

In order to achieve this aim the invention provides that the choke body of the valve is several outlet gaps with a preferably adjustable gap width, which together provides the necessary choke cross-section. If in this manner the choke cross-section is divided up or distributed among several annular openings for the flow through of the fluid, it is possible to cope with higher pressure differences with a low noise level in the valve or the load removing means with substantially less noise production than was previously the case, so that also the wear of the equipment is decidedly less. In any case with utilizing such a device, the noise behavior of the valve or the pressure reducing or unloading device is substantially improved.

A device in accordance with the invention can in practice be constructed in various different manners.

In accordance with a particularly simple and convenient embodiment of the invention the choke body is made up of several superposed choke discs, whose mutual seat distance is held by intermediate adjustable distance members or pieces. These distance members can for example consists of plate springs. In lieu of this it is possible, in order to obtain a particularly even holding part, to use mechanical means such as for example mechanical joints between the choke discs.

The individual choke discs are preferably centrally guided by means of a pin which for example can be constituted by the valve rod. In accordance with an advantageous modification the guide pin is separate from the valve rod and together with the throttle or choke discs and a seat ring forms an interchangeable component.

Particularly favorable characteristics with regards to the noise behavior of the device have been found to be obtained when the following dimensions are utilized:

disc height $h = 0.1 (D_1-D)$     gap width $S = 0.2 h$ gap number $n = \dfrac{D}{h}$     seat breadth $b = 1$ mm The invention makes possible a further increase in the allowable pressure differences for a low noise and cavitation-free operation of such valves owing to the fact that in a or in each annular outlet gap of the choke parts at least two choke steps are arranged in tandem.

In accordance with a simple embodiment of the invention these choke steps can consists of two or more choke gaps arranged in tandem from the inner part of the annular choke part in an outward direction with a mutual spacing and the choke gaps are preferably formed between annular projections and oppositely placed axial annular recesses of adjacent throttle discs or throttle rings respectively.

In order to stabilize the setting of the choke part, the choke steps which are provided at the opposite sides of the choke discs, can be connected by pressure equalization channels or ducts with each other.

A further improvement of the construction in accordance with the invention resides in that at the inlet to the inner space of the annular choke part, a pre-choke body is arranged which is attached on a front free end of the valve rod or the guide rod of the choke discs and takes part in the movements of the choke discs. It preferably has a form which is tapered in a direction opposite to the direction of passage through of fluid, for example a form which is conical or the like. In the case of very large pressure differences it is also possible to provide one or more such choke bodies in tandem at suitable openings for the passage of fluid. In this manner it is possible to provide for a pre-reduction of large pressure differences upstream from the inlet for the flowing medium into the interior space of the annular choke part without the noise level being substantially increased outside the valve.

LIST OF SEVERAL VIEWS OF DRAWINGS

In the drawings the invention is shown by way of example.

FIG. 1 shows in longitudinal section a valve with a choke body in accordance with the invention.

FIG. 2 shows an enlarged part A from FIG. 1.

FIG. 3 shows a cross-section through the valve choke body on the line B—B of the part A of FIG. 2.

FIG. 6 shows the inner part of a valve with further improvement in accordance with the invention, in longitudinal section.

FIG. 7 shows in longitudinal section an enlarged part "A" from FIG. 6.

DESCRIPTION OF PREFERRED EMBODIMENTS

Figure 4:
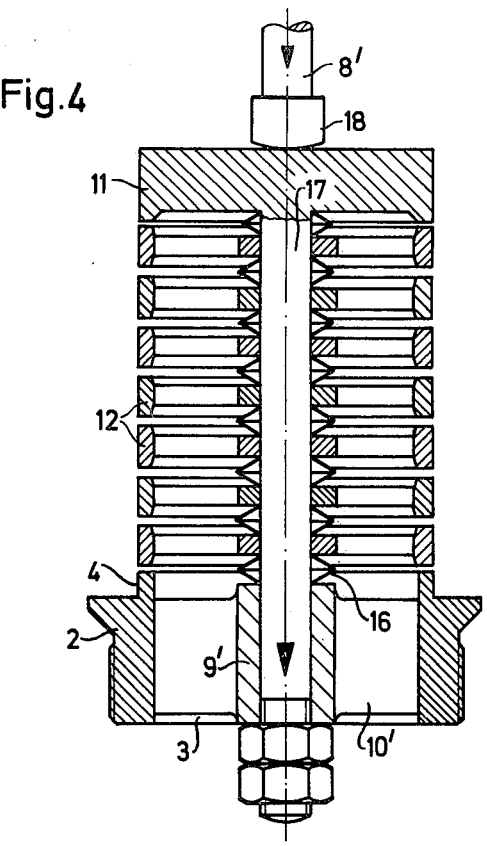
FIG. 4 shows in longitudinal section another embodiment of the choke body with the valve seat ring as a component.

In the case of the embodiment of the device in accordance with FIGS. 1 to 3 of the drawing, a valve seat ring 2 is placed in a valve housing 1 through which fluid flows in the direction indicated by the arrows. The valve seat ring 2 surrounds a passage opening 3, whose clearance width has a diameter D. The surface of the valve seat ring 2 is not planar, and instead has a collar 4 which extends in the direction of the passage of fluid so that the flow cannot become applied at this point.

The valve housing 1 merges above the valve seat ring into a housing neck 5, which has a clearance width a diameter $D_1$. The opening of the housing neck 5 is closed by a lid 6, in which a stuffing box 7 is incorporated. In the stuffing box 7 or gland, a valve rod 8 can be moved axially into the interior of the valve housing 1. The valve rod 8 can be operated or driven by suitable means.

The part, introduced into the interior of the valve housing 1, of the valve rod 8 extends as far as the valve passage opening 3 and at this position is connected by screw means with the hub 9 of a guide spider 10, which is guided for sliding movement in the passage opening 3. Underneath the housing lid 6 the valve rod 8 is connected in a fixed manner with a pressure disc 11, for example by welding. Between the hub 9 of the guide spider 10 and the pressure disc 11 on the valve rod 8, several or any number of choke discs 12 are arranged one after the other so that can be axially moved. Each choke disc 12 consists of an outer ring 13 with an upper and a lower sealing edge or sealing faces with a comparatively small seat breadth b, which for example only amounts to 1 mm. The ring 13 is connected by radial arms 14 with a disc hub 15, by means of whose hub hole the valve rod 8 is guided. Between each two respective choke discs 12 or between the uppermost choke disc and the pressure disc 11, constructed in the manner of a seat, a plate spring 16 is inserted. The plate springs 16 hold the choke discs 12 in the open position of the multi-disc choke body with mutual spacings with a gap width S, which bears a specific relationship to the height $h$ of the choke disc 12. Preferably the gap width S is approximately equal to or less than $0.2\ h$ and the disc height h can preferably be approximately equal to or less than $0.1\ (D_1 - D)$. The gap number $n$ is preferably approximately equal to or less than $_n{}^D$. With these dimensions particularly favorable data for the noise behavior of such a valve or a pressure reducing or unloading device with the same construction is achieved.

The necessary choke cross-section is thus distributed amongst several (in accordance with the embodiment shown eight) annular openings, each of which has a gap breadth of S. If the valve rod 8 exerts a pressure on the pressure disc 11, the plate springs 16 ensure that all choke discs 12 are pushed together against the spring action until they lie with their sealing surfaces or faces $b$ against one another and all gaps S are closed. With such a multi-disc choke body it is possible to ensure that there are relatively narrow outlet cross-sections and correspondingly narrow flow paths without any other flow guiding means especially constructed for the purpose.

The seat diameter of the choke body can be divided up into several or many exit gaps so as to be kept comparatively small, which is provides for more results than with using one or two outlet gaps with a comparatively large corresponding seat diameter.

The outlet gaps S should close as evenly as possible, something which in some cases can not be sufficiently well achieved with plate springs. The choke discs 12 can therefore be coupled with each other by other means, for example by mechanical joints or the like.

The embodiment of the device shown in FIG. 4 differs from that in accordance with FIGS. 1 to 3 chiefly in that in lieu of a continuous valve rod, a guide pin 17, separate from the rod, is provided, on which the individual choke discs 12 are arranged in a row so as to be axially displaceable, use being made of the plate springs 16. The guide pin 17 is at the top connected in a fixed manner with the pressure disc 11, while at the bottom it can be guided in a hole of the hub 9' of a holding spider 10' mounted in the passage opening 3 of the valve seat 2. The valve rod 8' in this case only has the rod head 18 pressing on the pressure disc 11.

Figure 5:
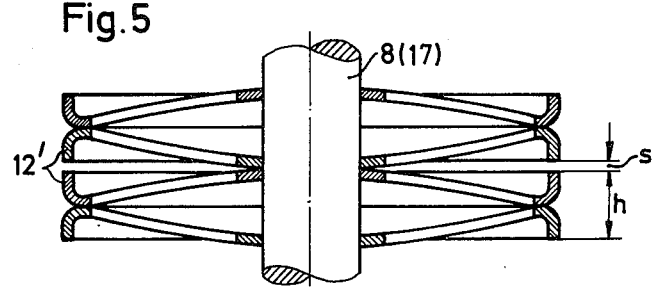
FIG. 5 shows in a broken away longitudinal section a further simplified embodiment of the choke body.

A further simplification of the device can be achieved in accordance with FIG. 5 by adopting the feature that the choke discs 12' in their center part simultaneously act as springs, for example by being constructed as resilient sheet metal discs so that special intermediate springs or plate springs can be dispensed with.

The choke discs 12 or 12' can consist of metallic materials or of plastic in accordance with the particular working conditions, such as temperature or pressure, existing.

In the case of the embodiment of the device in accordance with FIGS. 6 and 7 a valve seat ring 2 with a passage opening 3 is located in the valve housing 1 just as is the case with FIGS. 1 and 2. The housing neck 5 is, just as is the case with FIG. 1, terminated with a lid, not shown in the drawing, with a gland or stuffing box. A valve rod 19 extends through the gland or stuffing box and can be axially displaced into the housing neck. The valve rod 19 can be actuated by any suitable means.

The lower end of the valve rod 19 presses on the upper end of a guide pin 20, on which the throttle discs 21 are arranged in a row for axial displacement. Each choke disc consists of an outer ring 22, which is connected by radial arms 23 with a disc hub 24, and the hole in the respective hub serves for guidance of the guide pin 20. The end faces of the rings 22 have axial annular projections 25 and axial annular depressions or recesses 26, which so fit into each other that, for example, three choke gaps $S_1$, $S_2$, and $S_3$ are formed, as will be gathered from FIG. 7. The choke gaps or choke stages or steps can naturally also be provided at other suitable positions between the rings 22, such as, for example at the choke gap $S_2{}'$.

At the upper end of the guide pin 20, the inner space 27, surrounded by the rings 22 of the choke gaps 21, of the annular choke part is terminated by a pressure disc 28 connected with the guide pin 20, and the lower end edge of the disc 28 also has axial annular projections 25 and axial annular recesses 26, which cooperate with the oppositely placed annular recesses or annular projections of the uppermost choke disc 21 for the formation of the choke gaps $S_1$, $S_2$, and $S_3$. Accordingly on the upper end face of the valve seat ring 2 axial annular projections 25 and axial annular recesses 26 are provided, which cooperate with the oppositely placed annular recesses or annular projections of the lowermost choke disc 21 for the purpose of formation of choke gaps $S_1$, $S_2$, and $S_3$.

The guide pin 20 is provided at its lower end in the hub 29 with a bearing spider provided with radial arms 30, which are arranged in the valve seat ring 2.

Between two respective choke discs 21 and, respectively, between the uppermost choke disc and the pressure disc 28 and, respectively, between the lowermost choke disc and the bearing spider 29, 30, plate springs 31 are inserted, which hold these parts with a suitable mutual spacing. In the case of an embodiment with two or more choke steps it is possible, by way of example, to obtain favorable characteristics or results with the following dimensions: stroke of a choke disc = gap width S less than or equal to 10 mm, overlap of the individual steps u less than or equal to 0.2 S.

In lieu of the plate springs 31, it is possible, by way of example, also to use mechanical joints for resilient coupling of the choke discs. In order to stabilize the setting of the annular choke part in the rings 22 of the choke discs 21, pressure equalizing openings or ducts 32 are arranged, which connect together the choke steps or corresponding axial annular recesses 26, arranged on the opposite end faces of the rings 22.

Figure 8:
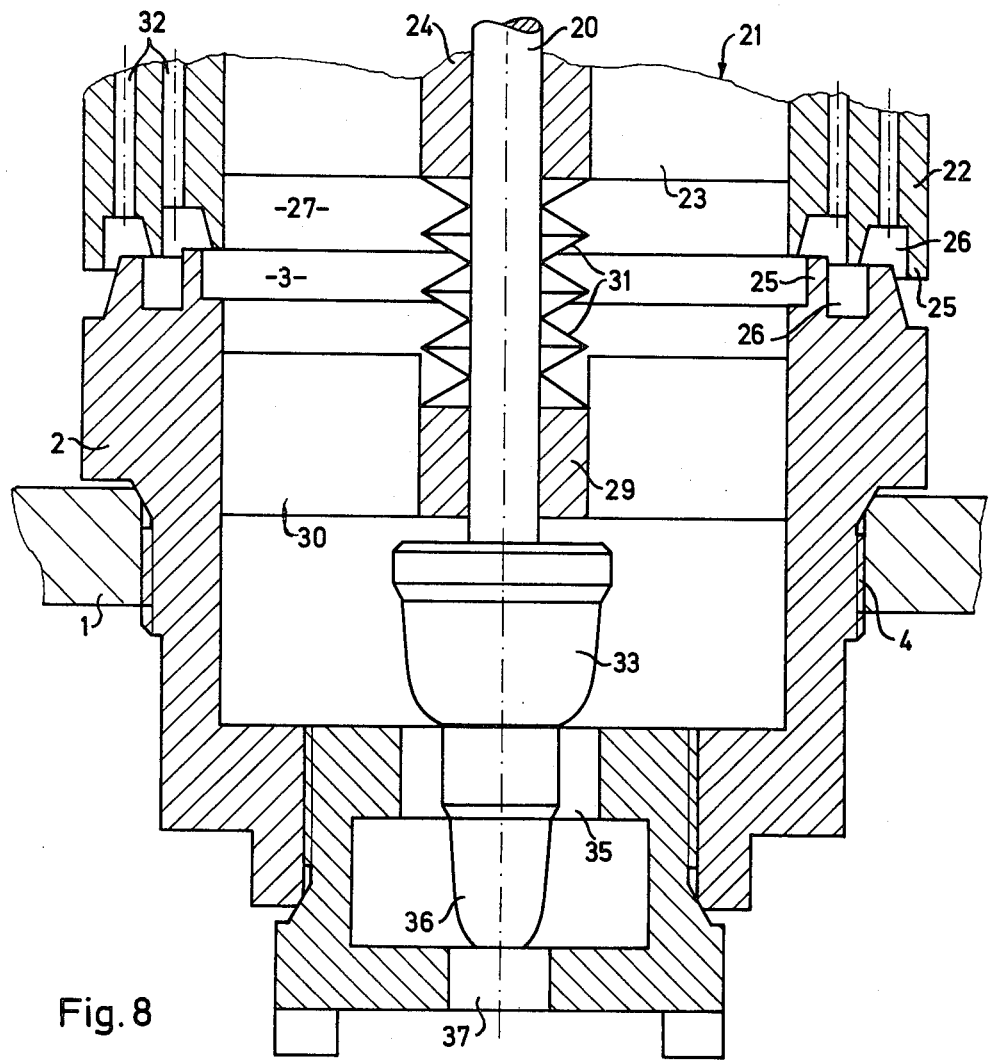
FIG. 8 shows in longitudinal section a modification of the inlet part of the choke part with two pre-choke bodies.

At the lower end of the guide pin 20 in accordance with FIG. 6, a downwardly conically tapering pre-choke body 33 is attached. This body can also taper in a curved manner. The body is arranged downstream from an inlet opening 35 provided in a screwed-in disc 34. As a result, a large pressure difference can be pre-reduced upstream from the annular choke part. Furthermore, this arrangement has the advantage, in the closed condition of the device, of a single seat valve with a small leakage rate. In the case of very large pressure differences this pre-reduction can be carried out in two or more stages. An example for this is provided by FIG. 8, in which upstream from the pre-choke body 33 a further pre-choke body 36 is arranged, which is attached behind or downstream from an inlet opening 27 also at the bottom end of the guide pin 20. Such a pre-reduction in pressure can also be used in a corresponding manner in the case of the apparatus in accordance with FIGS. 1 to 5.

In the case of large diameters of the annular choke body or, respectively, of the pre-choke body or bodies in the case of large pressure differences the driving forces necessary for actuating the valve or the like can be comparatively large. This disadvantage can be reduced with the help of load reducing means or it can be avoided by them, as shown for example in FIG. 6. In this case a cylinder space 38 serves for unloading the pre-choke body 33. The cylinder space 38 is connected with the inlet opening 35 by a hole 39 of the guide pin 20. In this respect an annular cylinder space 40, arranged concentrically in relation to the cylinder space 38, serves for unloading the annular choke part, whose inner space 27 is connected by openings 41 of the pressure disc 28 with the annular cylinder space 40. Into the cylinder spaces 38 and 40 respectively there extend in a downward direction annular pistons 42, 43, which are provided with sealing rings and are arranged on a stationary projection 44 of the valve housing lid.

The manner of operation of the device described above is substantially in accordance with the manner of operation of the device in accordance with FIGS. 1 to 5. If the valve rod 19 exerts a pressure on the guide pin 20 and on the pressure disc 28, the choke discs are pressed together against the action of the place springs 31, and the choke gaps $S_1$, $S_2$, and $S_3$ in all intermediate spaces become smaller until finally the discs lie firmly against each other. It is sufficient if for example the innermost or first choke gap $S_1$ has a smaller maximum gap width than the following choke gaps $S_2$ and $S_3$ in order to close the annular choke part completely. In order to obtain certain flow through characteristics the flanks $f$ of the choke steps can be made correspondingly.

Furthermore, the invention is not limited to the abovedescribed embodiments which are diagrammatically shown in the drawing and it includes all embodiments and modifications within the scope of the essential features of the invention.

I claim:

1. A device for obtaining quiet operation of valves for flowing media, more particularly of pressure reducing valves, having a choke or valve seat opening arranged to cooperate with a choke or valve closing body having fluid flow directed against its direction of closing, the improvement wherein the choke body has several annular outlet gaps with an adjustable gap width, which together produce the required choke cross-section, and at least one of the annular outlet gaps has at least two choke steps arranged in tandem, said choke steps being arranged on opposite sides of the choke discs and connected together by pressure equalizing ducts.

2. A device in accordance with claim 1, wherein a pre-choke body is arranged at the inlet opening leading into the interior space of the annular choke part.

3. A device in accordance with claim 2, wherein at least two pre-choke bodies are arranged at inlet openings provided with an axial spacing.

4. A device in accordance with claim 2, further comprising: pressure relieving means for relieving pressure between the pre-choke body and the annular choke part.

* * * * *